3,282,985
METHOD FOR PRODUCING DEXTRO-TRANS-PYRETHRIC ACID
Masanao Matsui, Tokyo, and Hiroshi Meguro, Sendai-shi, Japan, assignors to Sumitomo Chemical Company, Ltd., Osaka, Japan, a corporation of Japan
No Drawing. Filed Dec. 17, 1963, Ser. No. 331,123
Claims priority, application Japan, Dec. 25, 1962, 37/58,844
6 Claims. (Cl. 260—468)

The present invention is concerned with a novel method for producing dextro-trans-pyrethric acid from dimethyl dextro-transchrysanthemum dicarboxylate. In another aspect, the invention is concerned with an improvement in the production of dextro-trans-pyrethric acid from dimethyl dextro-trans-chrysanthemum dicarboxylate. In still another aspect, it is concerned with a method for separating dextro-trans-pyrethric acid from β-(2,2-dimethyl-3-methoxycarbonyl-cyclopropyl)methacrylic acid in a mixture of two compounds.

It is well-known that the insecticidal constituents of pyrethrum flower, pyrethroids, involve pyrethrin-I (iii-a), cinerin-I (iii-b), pyretherin-II (iii-c) and cinerin-II (iii-d), which are esters of cyclopentenolones (i), i.e. pyrethrolone (i-a) and cinerolonoe (i-b), with chrysanthemic acid (chrysanthemum monocarboxylic acid) (ii-a) and pyrethric acid (ii-b).

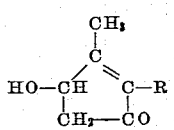

(a) R: —CH$_2$CH=CH—=CH$_2$
(b) R: —CH$_2$CH=CH—CH$_3$

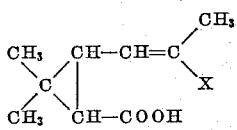

(a) X: —CH$_3$
(b) X: —COOCH$_3$
(c) X: —COOH

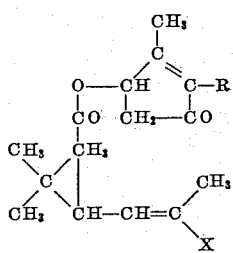

(a) R: —CH$_2$CH=CH—CH=CH$_2$
   X: —CH$_3$
(b) R: —CH$_2$CH=CH—CH$_3$
   X: —CH$_3$
(c) R: —CH$_2$CH=CH—CH=CH$_2$
   X: —COOCH$_3$
(d) R: —CH$_2$CH=CH—CH$_3$
   X: —COOCH$_3$

Recently, various analogs of the pyrethroids have been synthesized and commercially produced, such as those having allyl, furfuryl, cyclopentadienyl, and other side chains as the R radical.

When comparing the killing effect against insects of the compounds of type I and of type II of the pyrethroids and their analogs, those of type I are superior to those of type II. As to the rapid effectiveness for knock-down of insects, however, the latter is superior to the former. Accordingly, it is needed to produce pyrethric acid for the production of an insecticide of this kind having superior knock-down effectiveness.

Staudinger and Ruzicka have reported (Helv. Chim. Acta, 7, 177 [1924]) that "pyrethric acid"

$$([\alpha]_D^{18} = +103.9°)$$

has been obtained by decomposition of natural pyrethrin. Clombie at al. also have reported (J. Chem. Soc., 1957, 2743) that "pyrethric acid" ([α]$_D^{18}$=+103.4°) has been been obtained by a half-saponification of dimethyl ester of an optically active chrysanthemum dicarboxylic acid (ii-c).

The present inventors have formerly synthesized pyrethric acid in pure state starting from chrysanthemic acid, and found from the comparison of this synthesized pyrethric acid with the "so-called pyrethric acid" obtained by the former researchers, that the latter "acid" is not pure but is a mixture of pyrethric acid with its isomeric acid, β - (2,2-dimethyl-3-methoxycarbonyl-cyclopropyl)methacrylic acid (iv), having the following formula.

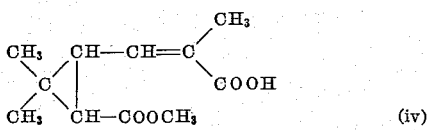

In other words, the optically active pyrethric acid (ii-b) obtained by the inventors has [α]$_D^{25}$=+88.7° and the optically active isomeric acid (iv) has [α]$_D^{25}$=+105.8°. Besides, a mixture of the two acids (ii-b and iv) obtained by the inventors in an amount of 50%–50% by weight is almost identical with the "so-called pyrethric acid" obtained by the former researchers as shown by their infrared spectra. That is to say, pure pyrethric acid has been obtained by the present inventors for the first time.

Since dextro-trans-pyrethric acid is the most effective among the stereo and optical isomers as the acidic moiety of pyrethriods and their analogs, it is also an advantageous method to separate pure dextro-trans-pyrethric acid from the "so-called pyrethric acid" obtained by a half-saponification of dimethyl dextro-trans-chrysanthemum dicarboxylate, in the state freed from the isomeric acid (iv) which is ineffective and useless when esterified with the cyclopentenolones (i).

Accordingly, it is an object of the invention to provide a novel method for producing dextro-trans-pyrethric acid in pure state. It is another object to provide an improvement in the production of dextro-trans-pyrethric acid from dimethyl dextro-trans-chrysanthemum dicarboxylate. It is still another object to provide a method for separating dextro-trans-pyrethric acid from the isomeric acid (iv) in the "so-called dextro-pyrethric acid." Other objects would be obvious from the following description.

To accomplish these and other objects, the inventors propose a method comprising half-saponifying dimethyl ester of dextro-trans-chrysanthemum dicarboxylic acid, treating the resulting mixture of the monomethyl esters with quinine to form a mixture of the salts thereof, subjecting the mixture of the salts to a fractional crystallization with an organic solvent to separate the quinine salt of dextro-trans-pyrethric acid from that of the isomeric acid (iv), and saponifying the separated salt to yield free dextro-trans-pyrethric acid.

The half-saponification of dimethyl dextro-trans-chrysanthemum dicarboxylate is effected according to the conventional procedure. Ordinarily, the dimethyl ester is contacted with the approximately equimolar amount of an alkali metal hydroxide or lower-alcoholate in water, lower-alcohol or a mixture thereof. For example, sodium or potassium hydroxide or methylate or ethylate is employed in aqueous methanol or ethanol. The mixture is in general stood still at room temperature or below 60° C. After a period of time of a half to several days, the lower alcohol, if employed, is removed by distillation, and water is added, if required. Acidification of the aqueous reaction mixture yields the "so-called pyrethric acid."

For the separation of dextro-trans-pyrethric acid according to the present invention, the "so-called pyrethric acid" is mixed with the equimolar amount of quinine in an organic solvent, such as acetone, whereby the quinine salts are formed.

According to the findings of the present inventors, the quinine salt of dextro-trans-pyrethric acid (ii-b) and that of the isomeric acid (iv) have significantly different solubilities in organic solvent from each other. For example, the quinine salt of dextro-trans-pyrethic acid is soluble in acetone, but that of the isomeric acid is hardly soluble. Thus, a fractional crystallization of the quinine salts of the "so-called pyrethric acid," namely a mixture of the two quinine salts, from an organic solvent enables the separation of the two acids. After the separation, the quinine salt is purified by recrystallization, if desired, and then treated with a dilute acid, for example, a dilute inorganic acid to obtain the free pyrethic acid in pure state. Moreover, the isomeric acid (iv) can also be obtained in pure state by the same way. Of course, the isomeric acid (iv) can be re-esterified to dimethyl chrysanthemum dicarboxylate and employed again for the method of the invention.

For more detailed illustration of the method of the invention, the following examples, merely by way of illustration and not by way of limitation, will be presented.

*Example 1*

A solution of 12.6 g. of dimethyl dextro-trans-chrysanthemum dicarboxylate in 50 ml. of methanol is mixed with 55 ml. of a methanolic one mol-concentration solution of sodium methylate and 5 ml. of water. The mixture is kept at room temperature for 48 hours. Thereafter, the methanol is evaporated and 50 ml. of water is added to the residue. The mixture is extracted with ethyl ether to remove the neutral substance, and the aqueous layer is carefully acidified with dilute hydrochloric acid, while being cooled with ice. The isolated oil is extracted with ethyl ether, and the ether layer is washed with water and dried over anhydrous sodium sulfate.

The residue left after evaporation of the ether is distilled in vacuo, and 10 g. of the "so-called pyrethric acid" is obtained at B.P. 140°–150° C./0.1 mm.

*Example 2*

Ten grams of the "so-called pyrethric acid" is dissolved in acetone. To the solution is mixed 16.3 g. of quinine dissolved in hot acetone. The mixture is warmed on a water bath for a few minutes, and then stood still overnight. The isolated crystals (crystal–A) is filtered and washed with acetone. The acetone filtrate and washings are combined together (mother liquor–B).

The crystal–A is recrystallized from methanol to yield 8.3 g. of colorless needles, melting at 198° to 200° C. Upon recrystallization, the melting point is raised to 204° to 207° C. The salt is mixed with 8.3 g. of water, then with dilute hydrochloric acid, and extracted with ether. The ether extract is well washed with water, dried over anhydrous sodium sulfate, and then distilled, to yield dextro-trans - β-(2,2 - dimethyl - 3 - methoxycarbonyl-cyclopropyl)methacrylic acid (iv), B.P. 128°–134° C./0.1 mm., $[\alpha]_D^{25} = +105.8°$ (c. 1.91 in carbon tetrachloride), $$\lambda_{max.}^{EtOH} = 232 \text{ m}\mu \ (\epsilon = 15,500)$$

The mother liquor–B is evaporated to remove acetone, leaving 16 g. of the quinine salt, which is then recrystallized with an acetone-water (5:1) mixture to yield 12 g. of needles, M.P. 164° C. Upon recrystallization, the melting point is raised to 169° C. The salt is treated as crystal–A, obtaining 4.7 g. of dextro-trans-pyrethric acid (ii-b), B.P. 135°–140° C./1mm., $[\alpha]_D^{25} = +88.7°$ (c. 2.13 in carbon tetrachloride), $$\lambda_{max.}^{EtOH} = 239 \text{ m}\mu \ (\epsilon = 14,700)$$

What we claim is:

1. A method for producing dextro-trans-pyrethric acid, which comprises half-saponifying dimethyl dextro-trans-chrysanthemum dicarboxylate with the approximately equimolar amount of a member of alkali metal hydroxide and lower-alcoholate, treating the mixture of the monomethyl esters with the approximately equimolar amount of quinine to form a mixture of the salts thereof, subjecting the mixture of the salts to a fractional crystallization with an organic solvent to separate the quinine salt of dextro-trans-pyrethric acid from that of dextro-trans-β-(2,2-dimethyl-3-methoxy - carbonyl - cyclopropyl)methacrylic acid, and hydrolyzing the separated salt to yield free dextro-trans-pyrethric acid.

2. A method according to claim 1, wherein the said organic solvent is acetone.

3. In the production of dextro-trans-pyrethric acid from dimethyl dextro-trans-chrysanthemum dicarboxylate by a half-saponification, an improvement which comprises treating the product which is a mixture of monomethyl esters of dextro-trans-chrysanthemum dicarboxylic acid, with the approximately equimolar amount of quinine to form a mixture of the salts thereof, subjecting the mixture of the salts to a fractional crystallization with an organic solvent to separate the quinine salt of dextro-trans-pyrethric acid from that of dextro-trans-β-(2,2-dimethyl-3 - methoxycarbonyl - cyclopropyl)-methacrylic acid, and hydrolyzing the separated salt to yield free dextro-trans-pyrethric acid.

4. An improvement according to claim 3, wherein the said organic solvent is acetone.

5. A method for separating dextro-trans-pyrethric acid from dextro-trans-β-(2,2-dimethyl-3-methoxycarbonyl-cyclopropyl)methacrylic acid in a mixture of the two compounds, which method comprises treating the acid mixture with the approximately equimolar amount of quinine to form a mixture of the salts thereof, subjecting the mixture of the salts to a fractional crystallization with an organic solvent to separate the quinine salt of dextro-trans-pyrethric acid from that of dextro-trans-β-(2,2-dimethyl-3-methoxycarbonyl-cyclopropyl)methacrylic acid, and hydrolyzing the separated salt to yield free dextro-trans-pyrethric acid.

6. A method according to claim 5, wherein the said organic solvent is acetone.

References Cited by the Examiner

UNITED STATES PATENTS 3,009,946  11/1961  Sankichi et al. _____ 260—468

LORRAINE A. WEINBERGER, *Primary Examiner.*

R. K. JACKSON, *Assistant Examiner.*